United States Patent [19]

Takahashi

[11] Patent Number: 4,643,552

[45] Date of Patent: Feb. 17, 1987

[54] FILM TRANSPORT INDICATOR FOR CAMERAS

[75] Inventor: Akira Takahashi, Kanagawa, Japan

[73] Assignee: Ricoh Company, Japan

[21] Appl. No.: 712,680

[22] Filed: Mar. 18, 1985

[30] Foreign Application Priority Data

Mar. 15, 1984 [JP] Japan .................................. 59-049695
May 1, 1984 [JP] Japan .................................. 59-088113

[51] Int. Cl.⁴ .......................................... G03B 17/36
[52] U.S. Cl. .................................................. 354/217
[58] Field of Search .............. 354/468, 173.1, 173.11, 354/215, 217, 218

[56] References Cited

U.S. PATENT DOCUMENTS 4,431,292 2/1984 Takahashi ...................... 354/173.11
4,432,628 2/1984 Sakuroda et al. ............... 354/217 X

FOREIGN PATENT DOCUMENTS 196534 11/1983 Japan .................................. 354/215

Primary Examiner—William B. Perkey
Attorney, Agent, or Firm—Guy W. Shoup

[57] ABSTRACT

A film transport indicator for a camera with a motor drive includes a film transport signal generator for generating a film transport signal in response to a film being wound by the motor drive, a quasi-signal generator for generating a signal analogous to the film transport signal, and a switching circuit for passing said film transport signal when it is generated by said film transport signal generator and for passing the signal from said quasi-signal generator for a prescribed period of time when said film transport signal is ceased. The feeding of the film is indicated on an indicator unit in response to the signals having passed through the switching circuit.

8 Claims, 7 Drawing Figures

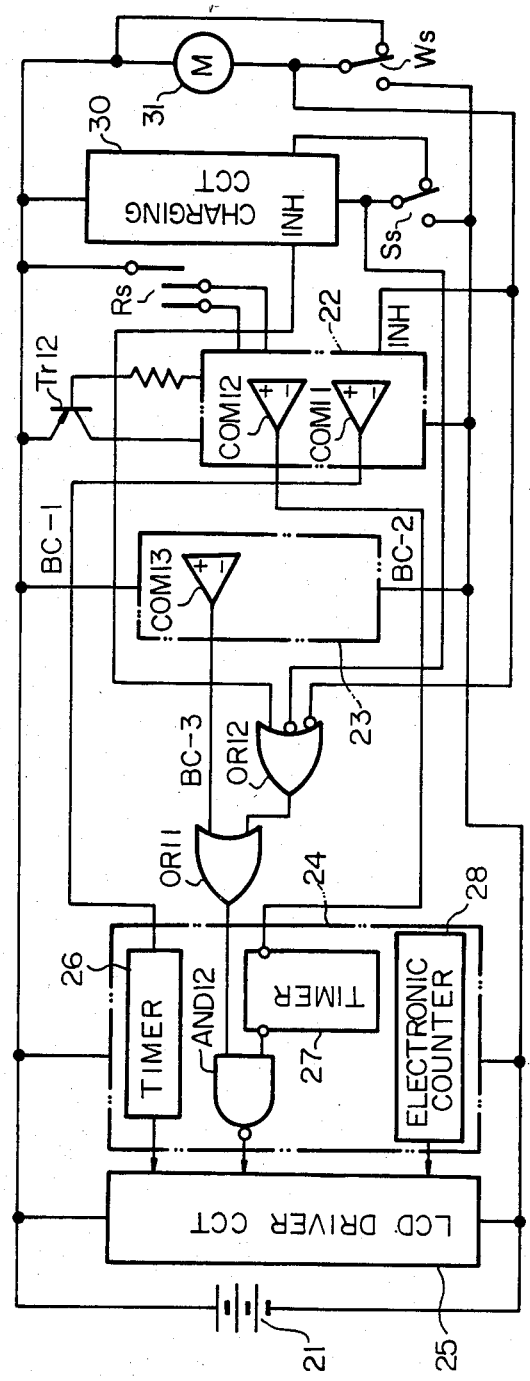
F I G. 9

FILM TRANSPORT INDICATOR FOR CAMERAS

BACKGROUND OF THE INVENTION

The present invention relates to a film transport indicator for cameras, and more particularly to a film transport indicator for cameras with motor drives.

Users of cameras with motor drives often tend to become doubtful, while taking pictures with the cameras, whether the film is actually wound by the motor or not. Some conventional motorized cameras include a lamp which flickers to indicate that the film is being fed or a liquid crystal display device for indicating feeding of the film, when the film is wound by the motor. However, since the film is normally wound immediately after one frame of the film has been exposed and the time required for advancing the film from frame to frame is quite short, the tendency is that the user frequently fails to confirm an indication given by the lamp or the liquid crystal display device.

SUMMARY OF THE INVENTION

It is an object of the present invention to provide a film transport indicator for cameras which allows a user to easily confirm that the film has been advanced by giving the same indication as a real-time indication of feeding of the film for a prescribed period of time after the film has been fed.

A film transport indicator for a camera with a motor drive according to the present invention includes a film transport signal generator for generating a film transport signal in response to a film being wound by the motor drive, a quasi-signal generator for generating a signal analogous to the film transport signal, a switching means for passing the film transport signal when it is generated by the film transport signal generator and for passing the signal from the quasi-signal generator for a prescribed period of time when the film transport signal is ceased, and an indicator unit for indicating feeding of the film in response to the signals from the switching means.

With the arrangement of the present invention, the user of the camera can easily confirm advancing of the film in the motor-driven camera since the indicator unit gives the same indication as a real-time indication of feeding of the film for the given period of time after the film has been fed.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
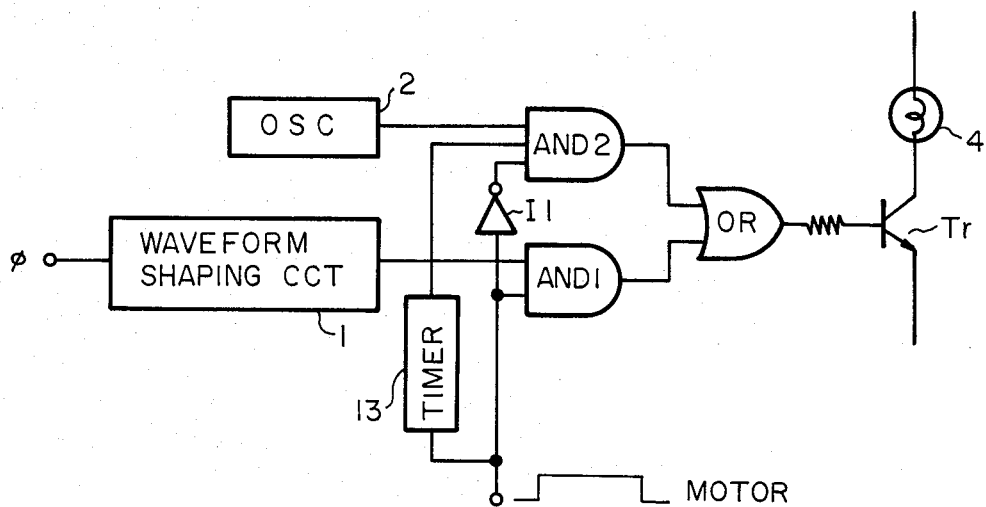
FIG. 1 is a block diagram of a film transport indicator according to an embodiment of the present invention.

A film transport signal $\phi$ applied to a waveform shaping circuit 1 shown in FIG. 1 is generated by a film transport signal generator of a known construction which may comprise a free sprocket that rotates in response to feeding of a film in a motor-driven camera. The film transport signal $\phi$ is shaped by the waveform shaping circuit 1 and then applied to an AND gate AND1. A motor signal produced while the film is being advanced by a film-winding motor is applied to the AND gate AND1, a timer 13, and an inverter I1 which issues an inverted signal to an AND gate AND2. The timer 13 generates a signal for a certain period of time after a negative-going edge of the motor signal and applies the generated signal to the AND gate AND2. The AND gates AND1, AND2 issues output signals to an OR gate OR which produces an output signal to render a transistor Tr conductive, thereby energizing a lamp 4. The AND gate AND2 is supplied with a signal of a constant period from an oscillator 2. The oscillator 2 serves as a quasi-signal generator for generating a signal analogous to the film transport signal $\phi$. The AND gates AND1, AND2 and the timer 13 jointly constitute a switching circuit for passing the film transport signal $\phi$ as long as it is produced and for passing the signal from the oscillator 2 for a prescribed period of time when the film transport signal $\phi$ is ceased, as will be described below. The lamp 4 serves as an indicator unit.

Figure 2:
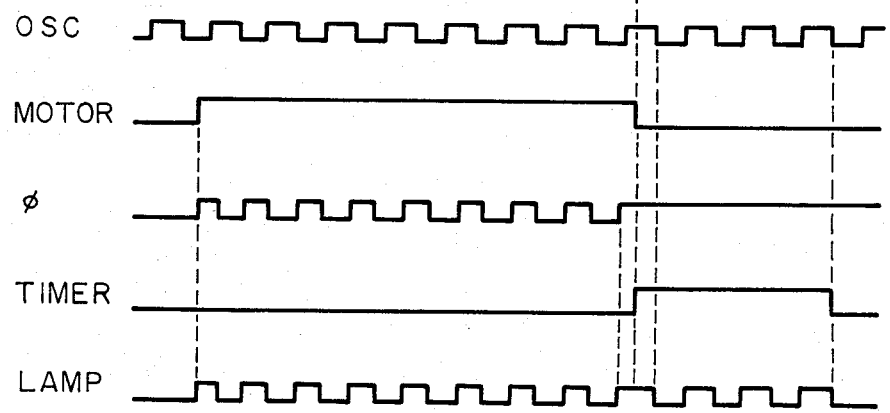
FIG. 2 is a timing chart showing operation of the film transport indicator shown in FIG. 2.

Operation of the film transport indicator shown in FIG. 1 will be described with reference to FIG. 2. While the film is being wound by the motor, the motor signal is applied to the AND gate AND1 which passes the film transport signal $\phi$ fed from the waveform shaping circuit 1. The film transport signal $\phi$ goes through the OR gate OR and is applied to the transistor Tr, which is rendered alternately conductive and nonconductive by the film transport signal $\phi$. The lamp 4 is now turned on and off to give a flickering indication representing that the film is being advanced. After the film has been wound by the motor, the motor signal is ceased and then the timer 13 produces a signal for a certain interval of time. The signal from the timer 13 is applied to the AND gate AND2 which allows the quasi signal from the oscillator 2 to pass to the OR gate OR. Therefore, the lamp 4 is now caused to flicker for the given period of time by the quasi signal from the oscillator 2, a condition by which the user can confirm that the film has been wound. The timer 13 should preferably be set to 2 seconds.

The waveform shaping circuit 1 may be dispensed with although it may be included as required.

Figure 3:
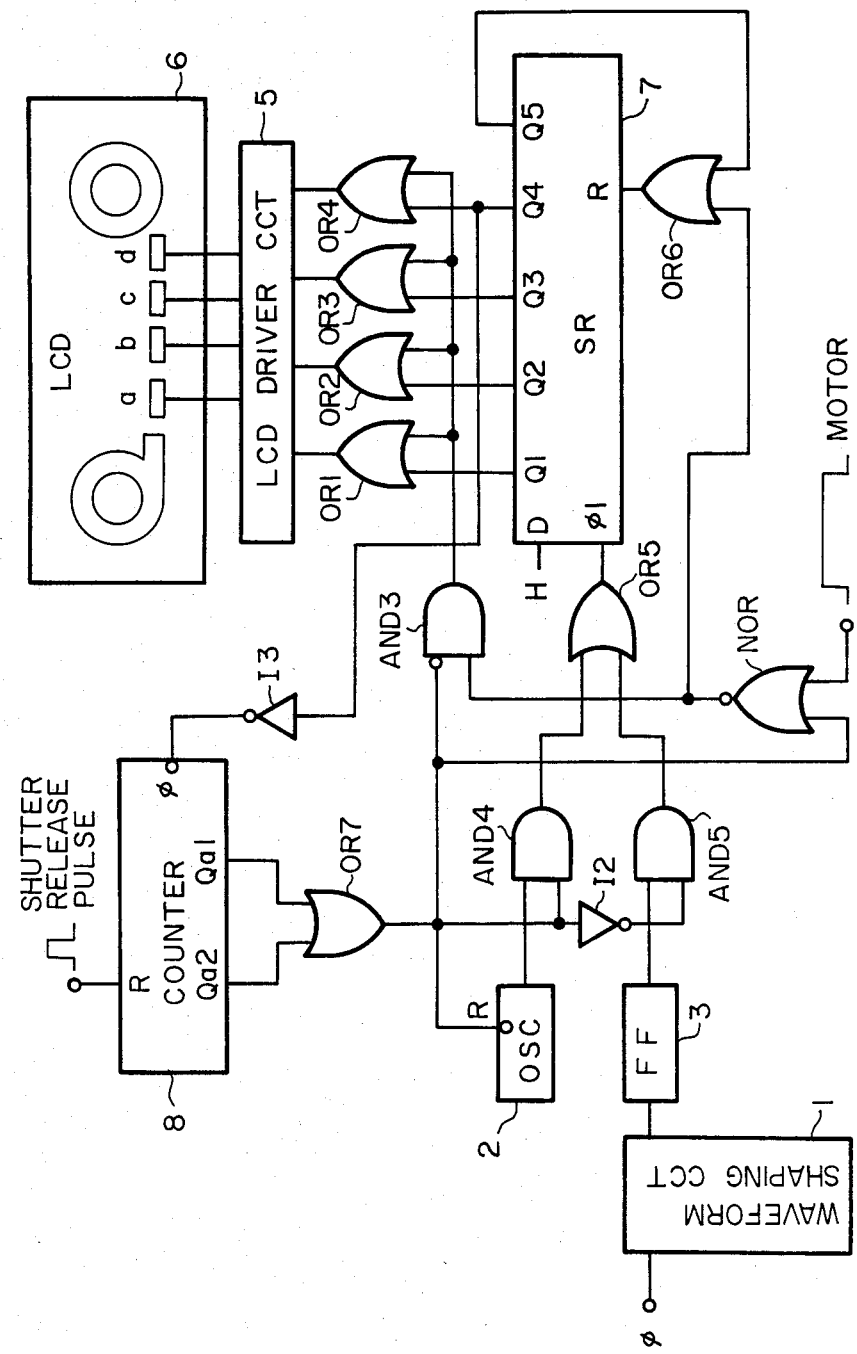
FIG. 3 is a block diagram of a film transport indicator according to another embodiment of the present invention.

FIG. 3 shows a film transport indicator according to another embodiment which employs liquid crystal display unit as an indicator unit. As illustrated in FIG. 3, a film transport signal $\phi$ shaped by a waveform shaping circuit 1 is frequency-divided by a flip-flop 3, which applies a frequency-divided signal to an AND gate AND5. A motor signal produced in response to the energization of a film-winding motor (not shown) is applied to a NOR gate NOR which issues an output signal through an OR gate OR6 as a reset signal to a shift register 7. The output signal from the NOR gate NOR is also fed to an AND gate AND3. An oscillator 2 serving as a quasi-signal generator applies a signal analogous to the film transport signal φ to an AND gate AND4. The AND gates AND4, AND5 issue their output signals via an OR gate OR5 as a clock signal to the shift register 7. The shift register 7 issues output signals Q1, Q2, Q3, Q4 to respective OR gates OR1, OR2, OR3, OR4 which apply their output signals to a liquid-crystal display driver circuit 5. The liquid-crystal display driver circuit 5 then energizes liquid-crystal display elements a, b, c, and d in an indicator unit 6. The shift register 7 also applies an output signal Q5 to the OR gate OR6. The output signal Q4 of the shift register 7 is inverted by an inverter I3 and delivered as a clock signal to a counter 8. The counter 8 has the same function as that of a timer for indicating feeding of a film for a prescribed period of time, the counter 8 being reset by a shutter release pulse. The counter 8 issues output signals Qa1, Qa2 to an OR gate OR7 which delivers its output signal to the NOR gate NOR and the AND gate AND4, and also as an inverted signal to the AND gate AND3 and a reset terminal of the oscillator 2. The output signal from the OR gate OR7 is also inverted by an inverter I2 which applies an inverted signal to the AND gate AND5. The AND gate AND3 issues an output to the OR gates OR1, OR2, OR3, OR4. The AND gates AND4, AND5 jointly constitute a switching circuit.

Figure 4:
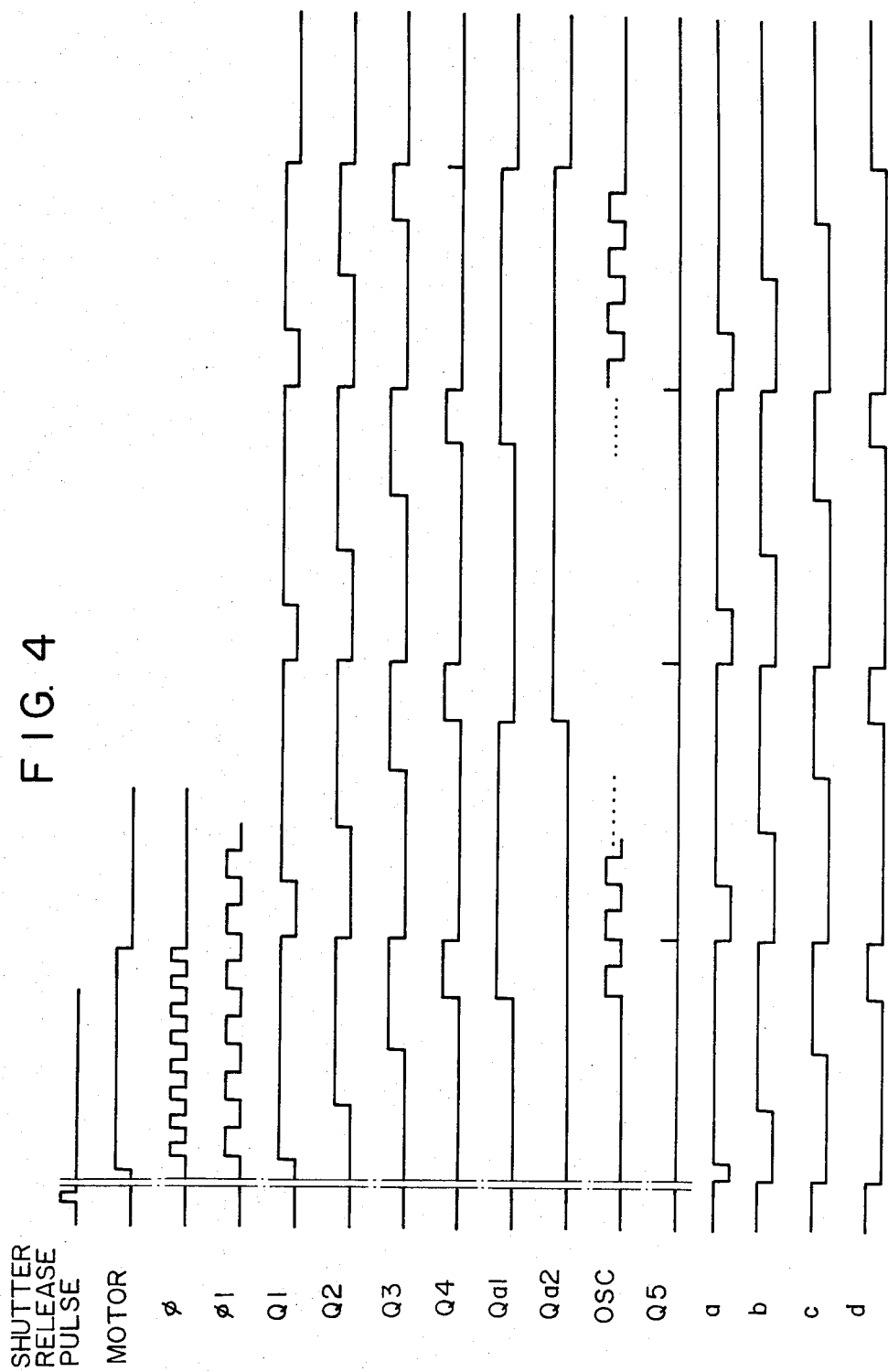
FIG. 4 is a timing chart showing operation of the film transport indicator shown in FIG. 3.

Operation of the film transport indicator shown in FIG. 3 will be described with reference to FIG. 4. When a shutter release pulse is generated, a shutter (not shown) is actuated. After the shutter has been operated, the film-winding motor (not shown) is energized to wind the film. First, the counter 8 is reset by the shutter release pulse. Then, energization of the motor generates a motor signal which releases the resetting of the shift register 7. The output signal of the NOR gate NOR goes low, and the output signal of the ANd gate AND3 goes low, making low one of the inputs of each of the four OR gates OR1 through OR4. Therefore, the liquid-crystal display elements a, b, c, d which have all been energized are de-energized. When the film is wound by the motor, a film transport signal φ is generated and shaped by the waveform shaping circuit 1. The shaped signal is then frequency-divided by the flip-flop 3 and applied to the AND gate AND5. Since the low-level output signal from the counter 8 is inverted by the inverter I2 into a high-level signal which is applied to the other input terminal of the AND gate AND5, the AND gate AND5 passes the film transport signal through the OR gate OR5 to the shift register 7. The shift register 7 successively shifts pulses of the film transport signal to render the outputs Q1, Q2, Q3, Q4 successively high. In the timing chart of FIG. 4, eight pulses are generated as the film transport signal φ while the film is fed by one frame, and these eight pulses are frequency-divided by the flip-flop 3 into four pulses per film frame. When the outputs of the shift register 7 become successively high, these high-level output signals are sequentially applied via the OR gates OR1 through OR4 to the liquid-crystal display driver circuit 5. The driver circuit 5 then energizes the liquid-crystal display elements successively in the pattern of from a to a, b to a, b, c to a, b, c, d. When the output Q4 of the shift register 7 goes high, this signal is applied as a clock signal to the counter 8, which then produces a high-level signal at the output Qa1. This high-level signal is applied to the AND gate AND4 and inverted by the inverter I2 into a low-level signal which closes the AND gate AND5. The high-level signal from the counter 8 makes the output of the NOR gate NOR low, closing the AND gate AND3. In response to the high-level signal from the counter 8, the oscillator 2 is released of its resetting and starts oscillating. The oscillating signal from the oscillator 2 is applied through the AND gate AND4 and the OR gate OR5 to the shift register 7. The shift register 7 then successively shifts pulses of the oscillating signal from the oscillator 2, thus continuously energizing the liquid-crystal display elements a, b, c, d. When the output Q5 of the shift register 7 goes high, the shift register 7 is reset by the output from the OR gate OR6. The shifter register 7 shifts again applied pulses successively to successively energize the liquid-crystal display elements a, b, c, d. Pulses of the output Q4 of the shift register 7 which are produced by repeated energization of the liquid-crystal display elements a, b, c, d are counted by the counter 8. When the counted value of the counter 8 reaches a predetermined value to make both the outputs Qa1, Qa2 low, the components of the film transport indicator return to their initial condition, whereupon the liquid-crystal display elements a, b, c, d are disabled to stop indicating the feeding of the film.

With the above embodiment, the film feeding indication is continuously given for a certain period of time after the film has actually been wound by the motor. Thus, the user can confirm such film feeding indication without fail. If the film is not properly advanced for some reason, the film transport signal φ is not applied, and hence the output Q4 of the shift register 7 does not go low. As a result, the counter 8 does not count pulses and the oscillator 2 remains inoperative, so that the liquid-crystal display elements will not be successively energized and no film transport indication will be displayed. Accordingly, the user can ascertain whether the film has properly been advanced or not.

The waveform shaping circuit 1 and the flip-flop 3 may be dispensed with. The preset count value to be reached by the counter 8 may be increased or reduced as desired. The indicator unit may not comprise liquid-crystal display elements, but may comprise lamps or light-emitting diodes.

Figure 5:
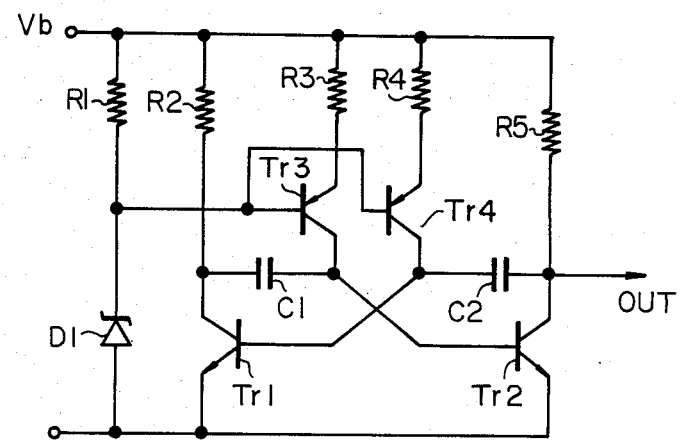
FIG. 5 is a circuit diagram of an oscillator that can be used in the present invention.
Figure 14:
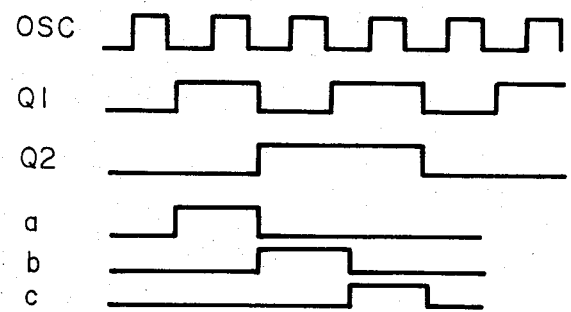

The degree by which a power supply battery has been consumed can be known by varying the manner in which the indicator unit gives an indication after the film has been advanced, dependent on the power supply voltage. FIG. 5 shows a circuit arrangement for confirming a battery consumption rate. The circuit arrangement shown in FIG. 5 is employed as the oscillator 2 serving as the quasi-signal generator illustrated in FIG. 1 or 3. The circuit of FIG. 5 has an astable multivibrator composed of transistors Tr1, Tr2, and capacitors C1, C2 for setting time constants thereof. The capacitors C1, C2 are charged by transistors Tr3, Tr4 energized by a constant current under the control of a resistor R1 and a zener diode D1. When the power supply voltage is higher, the oscillator oscillates at a higher frequency, and when the power supply voltage is lower, the oscillator oscillates at a lower frequency.

With the oscillator of FIG. 5 employed, the film transport indication after the film has been wound by the motor is given at a shorter period when the power supply voltage is higher, and at longer period when the power supply voltage is lower. Since the speed at which the film is wound varies with the degree by which the power supply battery is consumed, if the film feeding indication after the film has been wound were produced regardless of the power supply voltage, the rate of indication of the film feeding during the advancing of the film would differ from the rate of indication of the film feeding after the feeding of the film, with the result that the user would find the different indication rates unusual. However, the oscillator shown in FIG. 5 is effective in eliminating the difference between the indication rates.

Figure 6:
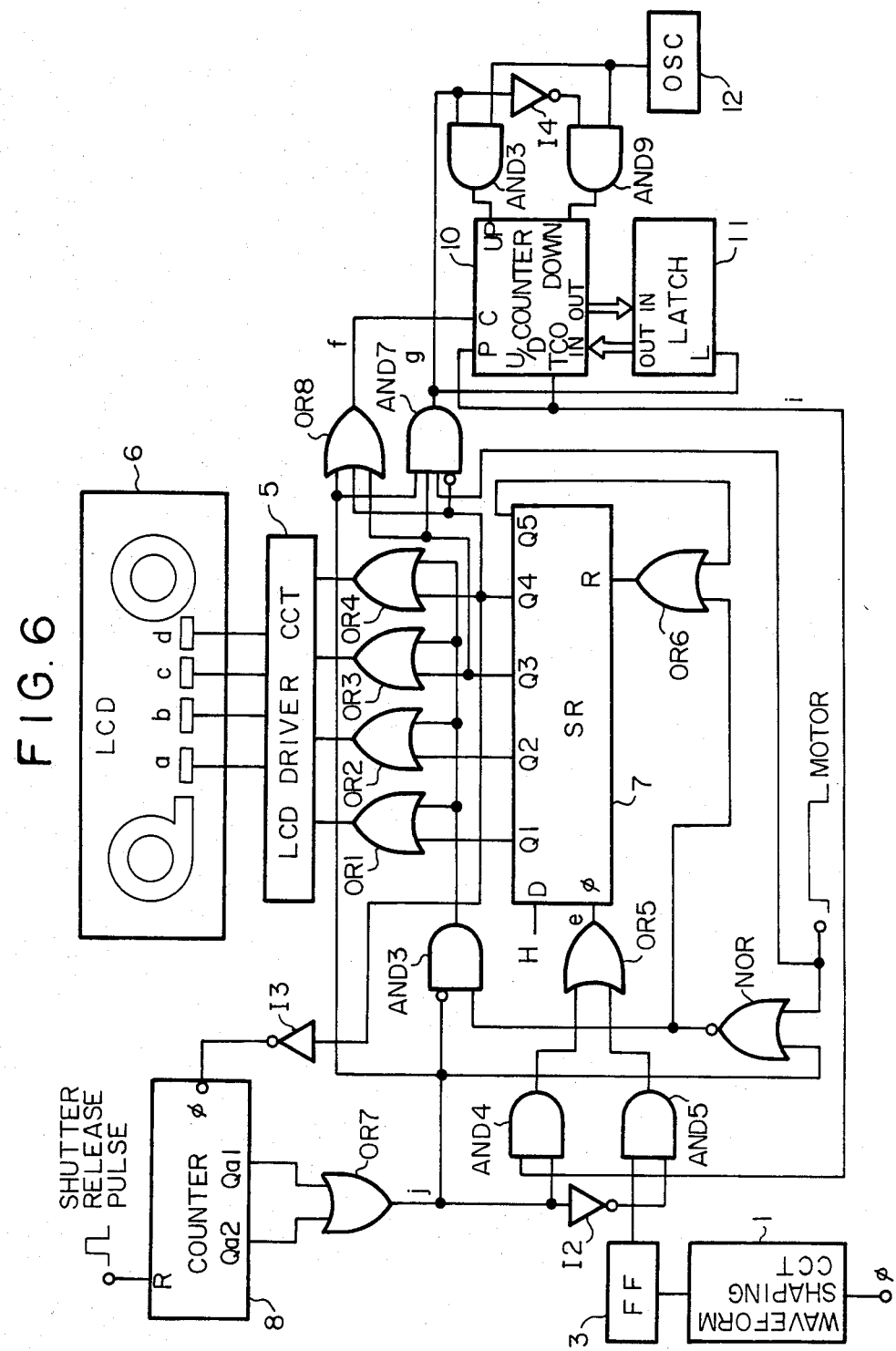
FIG. 6 is a block diagram of a film transport indicator according to still another embodiment of the present invention.

The difference between the rate of indication of the film feeding during the advancing of the film and the rate of indication of the film feeding after the film has been fed can also be eliminated by a circuit arrangement illustrated in FIG. 6. Since the circuit arrangement of FIG. 6 is basically the same as that of FIG. 3, identical or corresponding parts in FIG. 6 are denoted by identical or corresponding reference characters in FIG. 3, and only those components which are added in FIG. 6 will mainly be described. In FIG. 6, the OR gate OR7 supplied with the outputs Qa1, Qa2 from the counter 8 issues an output j to an OR gate OR8 and an AND gate AND7. The OR gate OR8 is also supplied with the output Q3 from the shift register 7. The AND gate AND7 is also supplied with the motor signal, the output Q3 from the shift register 7, and an inversion of the output Q4 from the shift register 7. The OR gate OR8 applies an output f as a clear signal to an up/down counter 10. The AND gate AND7 applies an output g as a load signal to a latch 11, and also applies the same output to an AND gate AND8 and, after being inverted, to an ANd gate AND9. The AND gates AND8, AND9 are supplied with pulses of a constant period from an oscillator 12. The output from the AND gate AND8 is applied as an up-counting signal to the up/down counter 10, and the output from the AND gate AND9 is applied as a down-counting signal to the up/down counter 10. The counter 10 applies a borrow output signal i as a preset signal to the counter 10 and also applies the borrow output signal i to the AND gate AND4. The counter 10 and the latch 11 have interconnected input and output terminals for transmitting and receiving signals therebetween. The other structural details of FIG. 6 are the same as those shown in FIG. 3. The borrow signal i from the counter 10 is analogous to the film transport signal φ, and hence the counter 10 serves as a quasi-signal generator.

Figure 7:
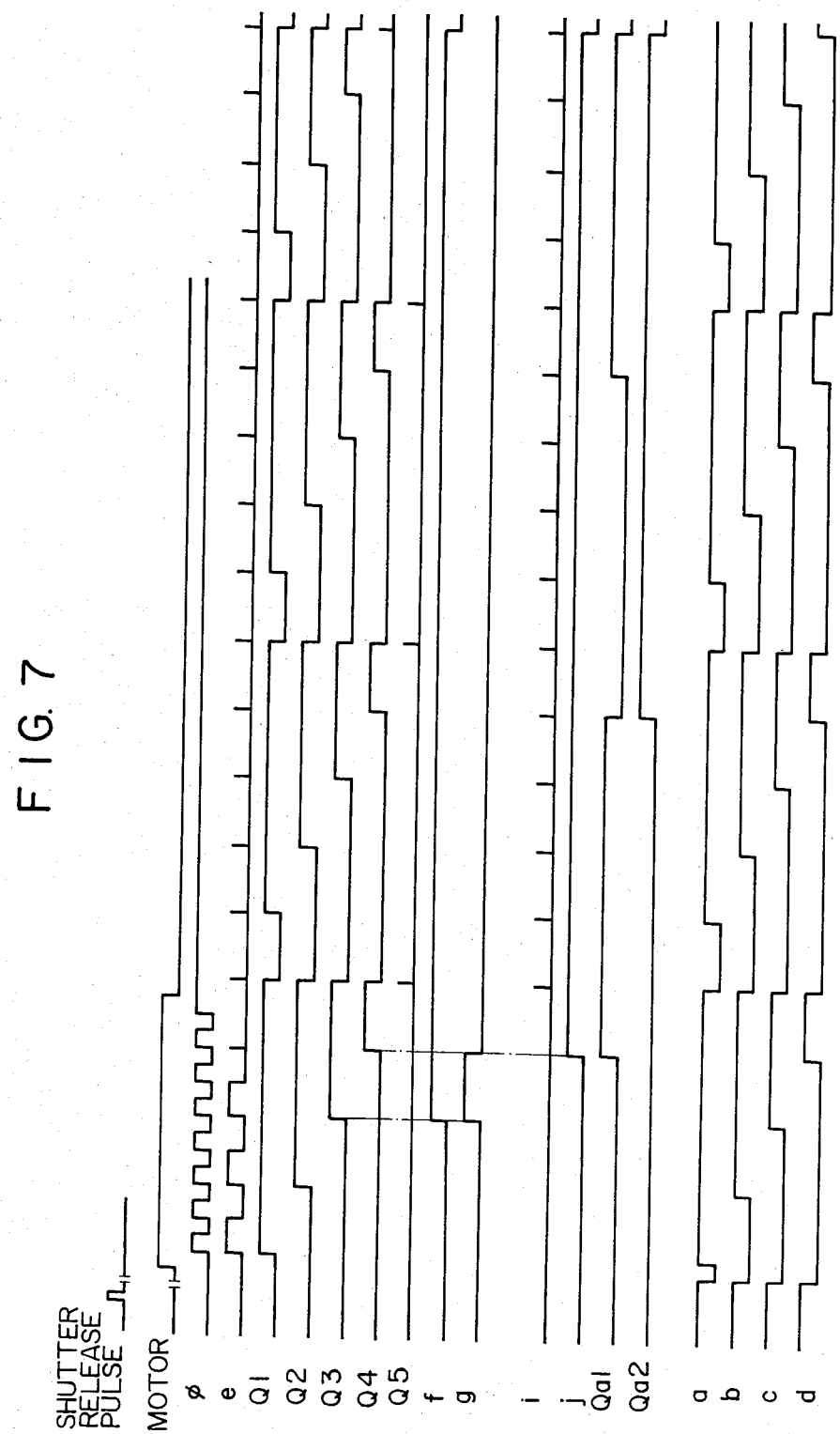
FIG. 7 is a timing chart showing operation of the film transport indicator shown in FIG. 6.
Figure 8:
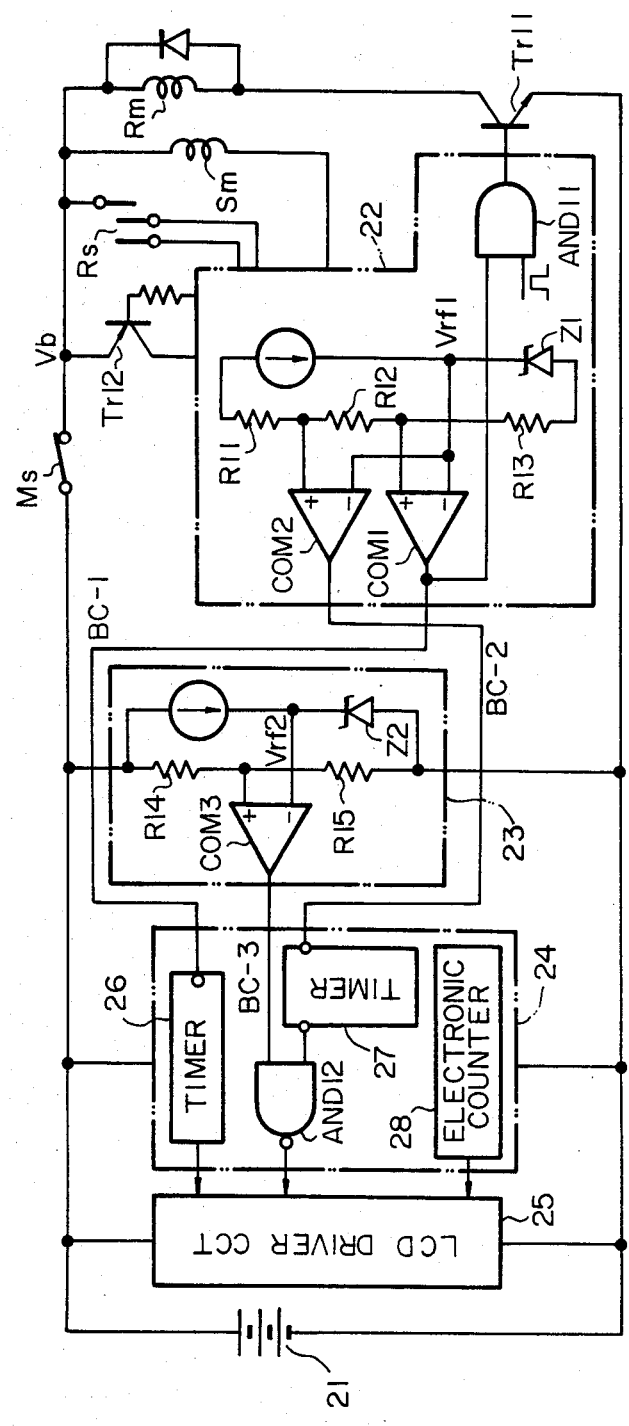
Figure 10:
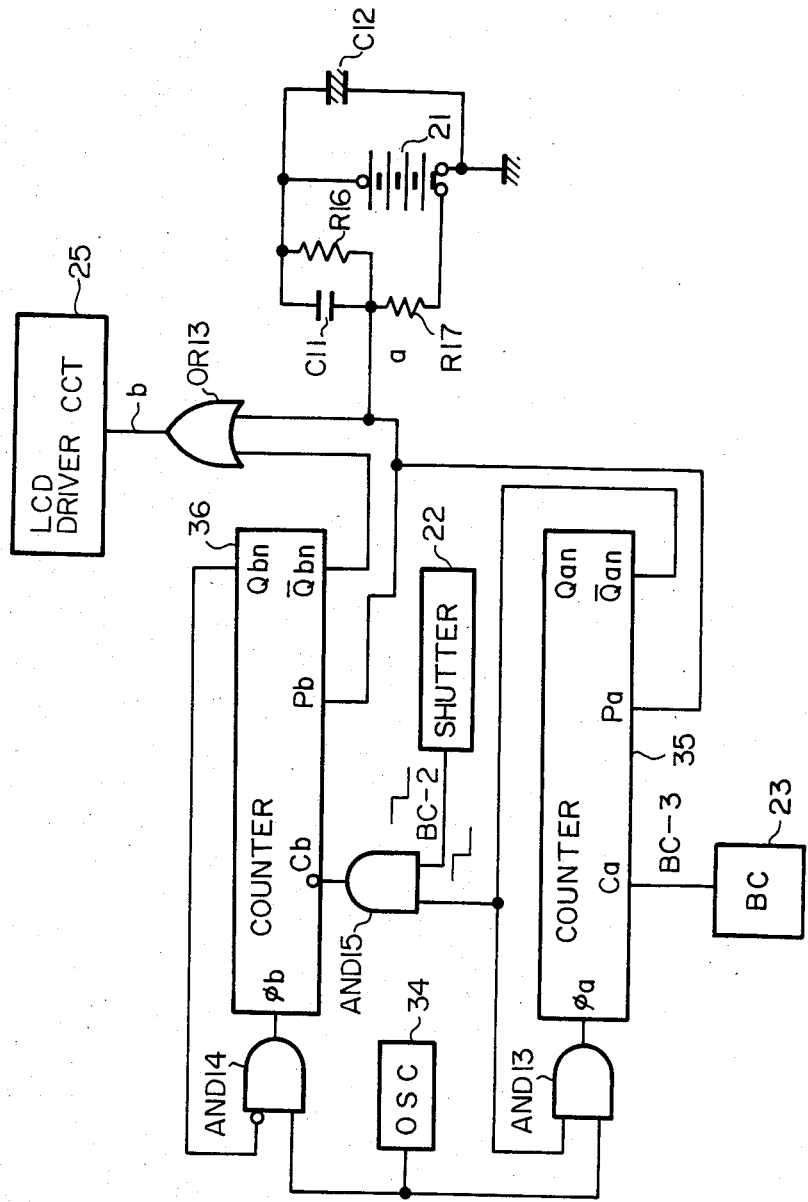
Figure 11:
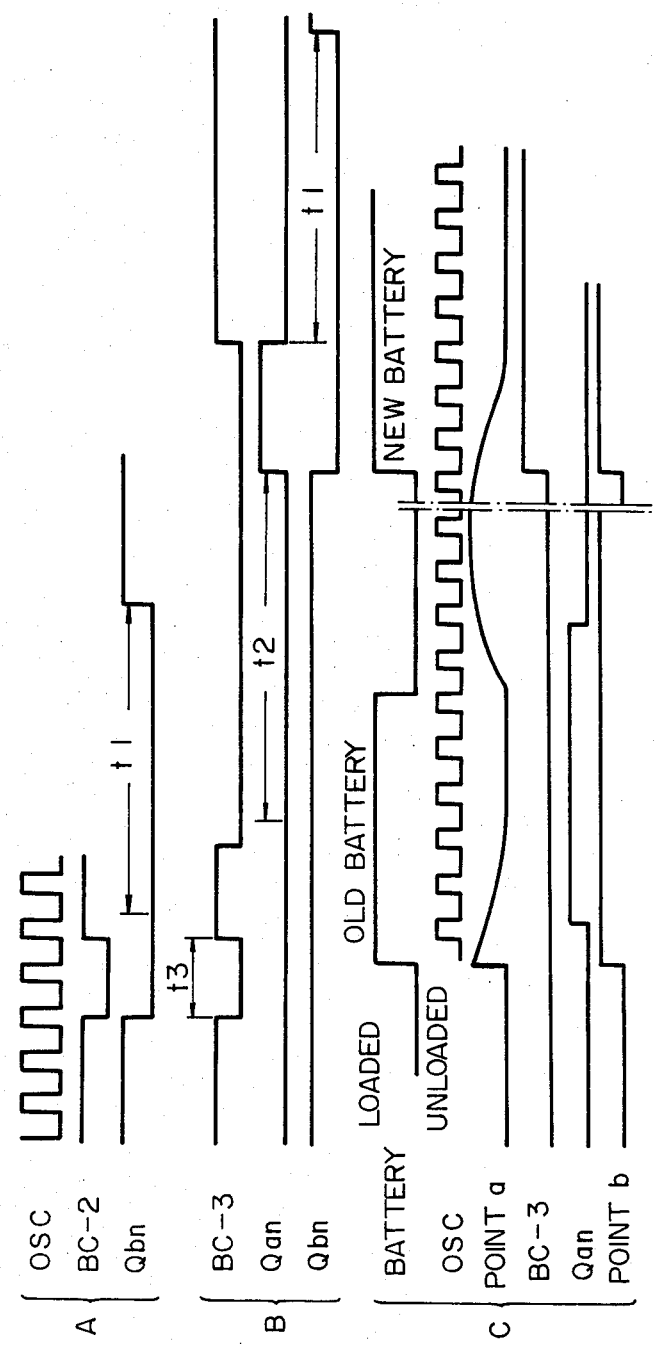
Figure 12:
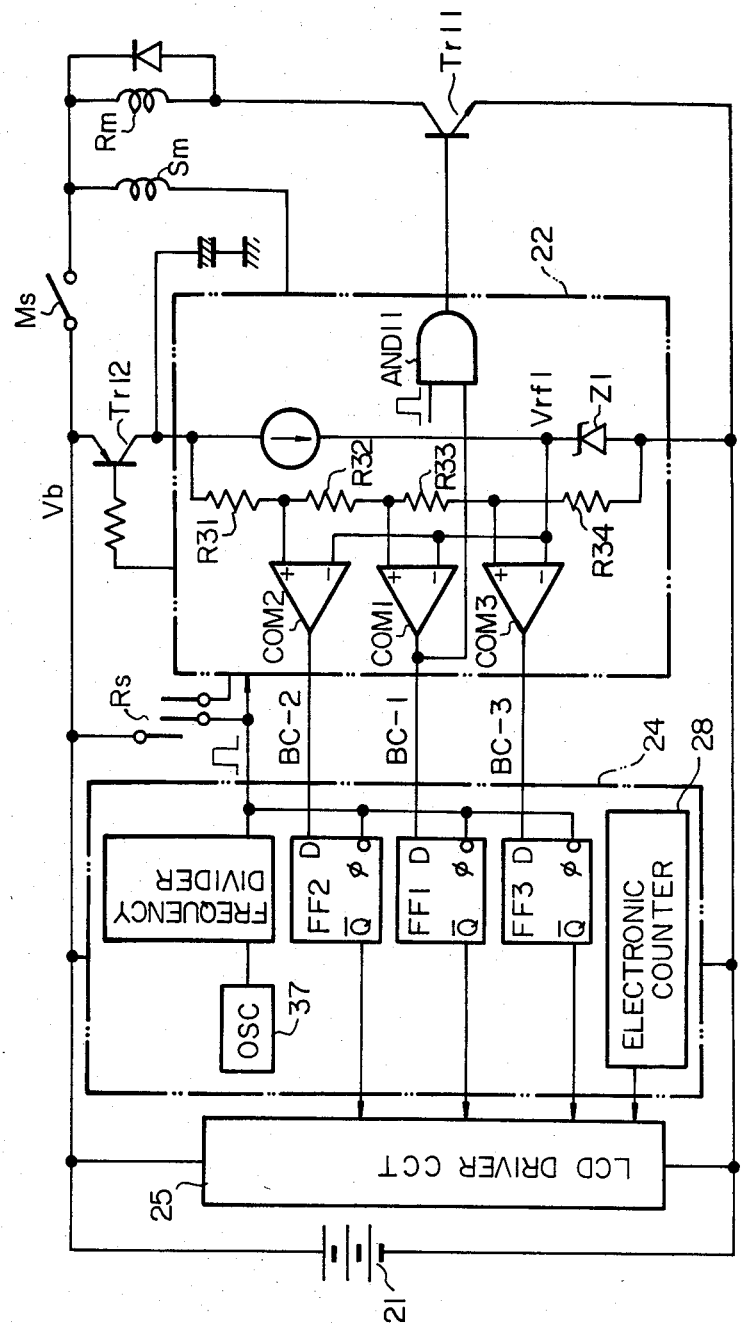
Figure 13:
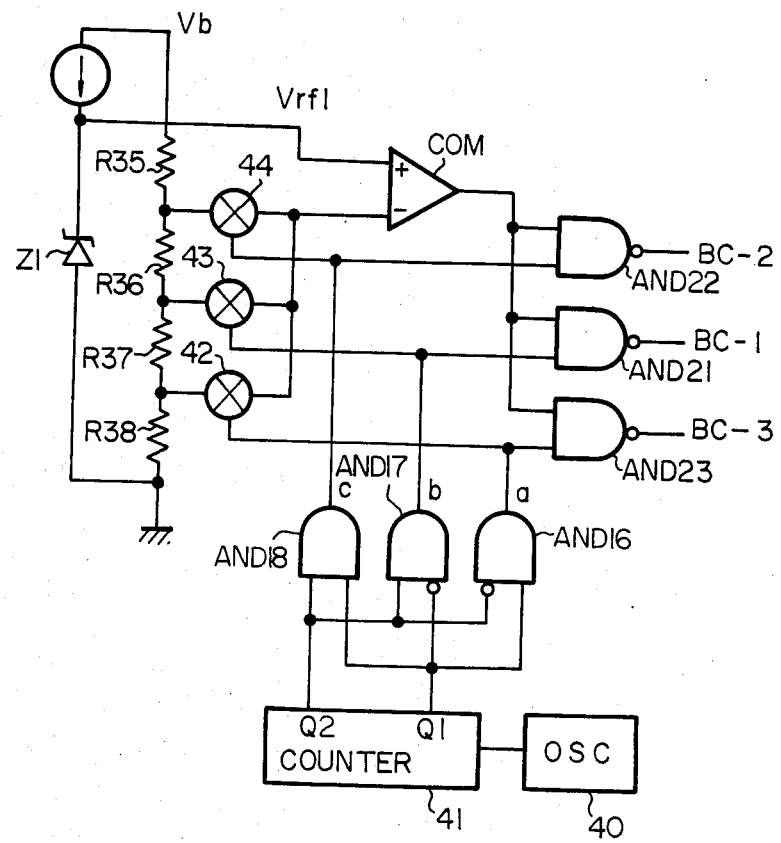
Figure 15:
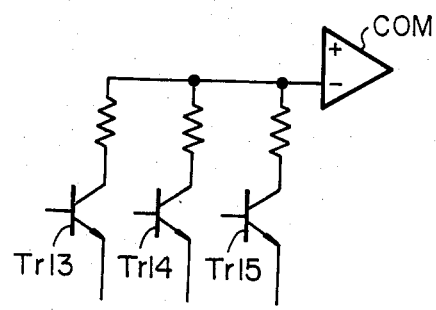

Operation of the circuit arrangement of FIG. 6 will be described with reference to FIG. 7. Before the film is wound by the motor, the output of the NOR gate NOR is high and hence the output of the AND gate ANd3 is high, so that all of the liquid-crystal display elements a, b, c, d are energized. When the motor is energized to issue the motor signal, all of the liquid-crystal display elements a, b, c, d are de-energized. As the film transport signal φ is applied, the liquid-crystal display elements a, b, c, d are successively energized to indicate that the film is being advanced. At this time, the output Q3 of the shift register 7 is rendered high by the third signal applied to the input φ1 of the shift register 7, whereupon the output f from the OR gate OR8 goes high to release the resetting of the counter 10. During an interval from the time when the output Q3 of the shift register 7 goes high to the time when the output Q4 thereof goes high while the motor is being energized, the output g of the AND gate AND7 is high, allowing pulses from the oscillator 12 to pass through the AND gate AND8 to the up-counting terminal of the counter 10. The counter 10 then starts counting up the pulses of the oscillator 12 as long as the signal g is high. At the same time, the signal g is applied as a load signal to the latch 11, and the latch 11 latches a count value (indicated by "A") of the counter 10. When the output 4 of the shift register 7 goes high, the output g of the AND gate AND7 goes low. The pulse signal from the oscillator 12 then passes through the AND gate AND9 to the down-counting terminal of the counter 10, which now starts counting down the pulses. When the counter 10 counts down the pulses until the count value A is reached, the counter 10 issues a borrow signal i which is applied as a preset signal to itself. The counter 10 is set again to the output (equal to A) of the latch 11, for thus repeating the down-counting operation. Since the borrow signal i is applied to the AND gate AND4, the borrow signal i is allowed to pass through the AND gate AND4 when the signal j goes high, that is, the output Q4 of the shift register 7 goes high. The borrow signal i is now applied, instead of the film transport signal φ, via the OR gate OR5 to the shift register 7. The shift register 7 successively shifts applied pulses each time the signal i is applied. When the output Q5 of the shift register 7 goes high, this high-level signal is fed through the OR gate OR6 to reset the shift register 7 by itself. Each time the signal i is applied to the shift register 7, therefore, the liquid-crystal display elements a, b, c, d are successively energized. This operation is repeated several times until the outputs Qa1, Qa2 of the counter 8 which counts the output Q4 of the shift register 7 go low, whereupon the signal j goes low and no pulse is applied to the terminal φ1 of the shift register 7. Simultaneously, the output of the NOR gate NOR goes high to render the outputs of all of the four OR gates OR1 through OR4 high. The liquid-crystal display elements a, b, c, d are all energized (to indicate that the film is available for exposure), and the operation of the film transport indicator comes to an end.

With the arrangement of FIG. 6, as is apparent from the foregoing, the period of time after the output Q3 of the shift register 7 goes high and before the output Q4 thereof goes high immediately prior to the ending of the motor-driven film advancing movement, it is temporarily stored by the latch 11, and the film transport indication is given according to the stored period of time after the film has actually been advanced. As a consequence, the rate of indication of the film feeding while the film is being wound by the motor and the rate of indication of the film feeding after the film has been wound by the motor coincide with each other. The user can also determine the degree by which the power supply battery has been consumed by observing the indication rate of the feeding of the film. As with the embodiment of FIG. 3, when the film is not advanced for some reason, the liquid-crystal display elements are not successively energized, letting the user know a film feeding failure.

Although certain preferred embodiments have been shown and described, it should be understood that many changes and modifications may be made therein without departing from the scope of the appended claims.

What is claimed is:

1. A film transport indicator for a camera with a motor drive, comprising:
   (a) a film transport signal generator for generating a film transport signal in response to a film being wound by the motor drive;
   (b) a quasi-signal generator for generating a signal analogous to said film transport signal;

(c) switching means for passing said film transport signal when it is generated by said film transport signal generator and for passing the signal from said quasi-signal generator for a prescribed period of time when said film transport signal is ceased; and (d) an indicator unit for indicating feeding of the film to a camera user in response to the signals having passed through said switching means.

2. A film transport indicator according to claim 1, wherein said switching means comprises a first AND gate for passing said film transport signal when it is generated by said film transport signal generator, a timer operable for a prescribed period of time from the time when said film transport signal has been ceased, and a second AND gate for passing the signal from said quasi-signal generator while said timer is in operation.

3. A film transport indicator according to claim 1, wherein said indicator unit comprises lamps energizable by said signals.

4. A film transport indicator according to claim 1, wherein said indicator unit comprises liquid-crystal display elements energizable by said signals.

5. A film transport indicator for a camera with a motor drive, comprising:

(a) a film transport signal generator for generating a film transport signal in response to a film being wound by the motor drive;

(b) a quasi-signal generator for generating a signal analogous to said film transport signal;

(c) switching means for passing said film transport signal when it is generated by said film transport signal generator and for passing the signal from said quasi-signal generator for a prescribed period of time when said film transport signal is ceased; and (d) a shift register for shifting the signals having passed through said switching means; and (e) an indicator unit for giving successive indications in response to output signals from said shift register.

6. A film transport indicator according to claim 5, wherein said indicator unit comprises liquid-crystal display elements energizable by said output signals.

7. A film transport indicator according to claim 5, wherein said quasi-signal generator comprises an oscillator with an oscillation frequency thereof variable dependent on a power supply voltage applied thereto.

8. A film transport indicator according to claim 5, wherein said quasi-signal generator comprises an up-/down counter for measuring intervals of shifting operation of said shift register while said film is being wound by the motor drive, and a latch for storing said measured intervals, said counter producing a borrow signal as the signal from said quasi-signal generator at each of said stored intervals.

* * * * *